United States Patent [19]
Flory

[11] 4,414,572
[45] Nov. 8, 1983

[54] CLAMP FOR LINE-ALTERNATE SIGNALS

[75] Inventor: Robert E. Flory, Princeton, N.J.

[73] Assignee: RCA Corporation, New York, N.Y.

[21] Appl. No.: 358,381

[22] Filed: Mar. 15, 1982

[51] Int. Cl.³ .............................................. H04N 5/18
[52] U.S. Cl. ................................................... 358/172
[58] Field of Search .............................. 358/171–172, 358/173

[56] References Cited

U.S. PATENT DOCUMENTS

| | | | |
|---|---|---|---|
| 3,558,815 | 1/1971 | Banks | 178/7.1 |
| 4,257,065 | 3/1981 | Papay | 358/172 |
| 4,261,015 | 4/1981 | Dakroub | 358/172 |

*Primary Examiner*—Michael A. Masinick
*Attorney, Agent, or Firm*—Eugene M. Whitacre; William H. Meise

[57] ABSTRACT

A clamp for television signals, the sources of which alternate on a line recurrent basis includes a plurality of capacitors having a common terminal coupled to the sources of signal and a multiplexing switch for sequentially connecting one of the capacitors between its source and a clamp.

6 Claims, 3 Drawing Figures

CLAMP FOR LINE-ALTERNATE SIGNALS

This invention relates to clamps or direct-voltage restorers for television signals alternate lines of which are derived from different sources.

In the field of communication signal processing, it is well known to use a capacitor in series with a signal path in order to block or prevent a direct voltage on one side of the capacitor from affecting a circuit on the other side. This practice is known as direct-current (DC) blocking and is also known as alternating-current (AC) coupling. Such AC coupling occurs many times in signal processing, particularly in television signal processing. A signal which is AC-coupled from a source to a utilizing or load-circuit will assume a new voltage reference, that on the output or load side of the capacitor. As is well known in the art, the reference voltage on the load side becomes the average value of the signal, and therefore makes both positive-going and negative-going excursions, the magnitudes of which are determined both by the duration and the amplitude of the excursions as is explained in more detail at pages 160–165 and 180–182 of the text "Electronic Circuit Analysis", Volume 1 by Philip Cutler, published in 1960 by McGraw Hill Book Company, and in many other standard texts.

In television practice, information relating to the picture is ordinarily conveyed in the form of the amplitude of the signal voltage during the "active" portion of a block of signal information known as a horizontal line interval, and the horizontal line intervals are themselves organized into a larger pattern known as a frame, which is the basic unit representing a complete image. In order to be able to identify the active portion of the signal and its relationship to the frame, uniquely identifiable synchronizing signals are included within blanking intervals, which are the non-active portions of the television signals. The usual practice is to identify the blanking and synchronizing portions of the signal by forming them as the extreme amplitude excursions of a particular polarity of the signal. Light and dark portions of the image, therefore, are identifiable by the magnitude of their excursion away from either the synchronizing-signal or blanking-representative levels. Ordinary NTSC signals have an extreme amplitude excursion at the horizontal and vertical sync tips, and white level at the other extreme. The blanking and block levels lie between the extremes.

The processing of television signals necessarily involves a great deal of AC coupling. As mentioned, AC coupling removes the direct-voltage reference from the signal, and the signal excursion on the load side of a capacitor or transformer will depend upon the magnitude and duration of the excursions of the signal in either polarity. The television image is not static, however, and therefore the amplitude of the active portion of each line may vary from line to line, depending upon the picture content. Thus, the absolute value of the signal excursions on the load side of an AC coupling will depend upon the picture content. The television kinescope or picture tube by which images are reproduced has a fixed voltage level which is representative of black and another fixed level representative of white. If a television signal which has been AC-coupled is applied to the kinescope to form an image without further processing, scenes intended to be black with a few white highlights will appear to be gray with white highlights, and a picture intended to be white with a few gray portions will appear gray with a few black portions instead. It is known to overcome this problem by the process known variously as clamping, DC restoration, DC reinsertion and the like. In television practice, clamping is accomplished by forcing an identifiable portion of the signal, as for example the sync-tip level, or perhaps the blanking level, to an absolute voltage. This known function is almost universally accomplished by means of a keyed clamp, which includes a switch which is coupled between the load side of an AC-coupling capacitor and a reference voltage, and which is made conductive during the desired identifiable portion of the signal.

A keyed clamp is described in U.S. Pat. No. 3,558,815 issued Jan. 26, 1971 in the name of A. J. Banks. The Banks clamp is adapted for correcting a problem which arises when switching between two television signal sources which may at the moment of switching be conveying information relating to different images and which may therefore have different average picture levels (APL). Such switching takes place when the producer or editor of a television program wishes to change scene. At the time of the switch, an ordinary keyed clamp may cause a transitory change in the average level of the signal on the load side. The duration of this transitory phenomenon depends upon the time constant of the associated charging path and may extend over a period of several horizontal lines. The Banks arrangement includes switches and storage devices which correct within an interval of a single horizontal line, but which may permit some perturbations during the horizontal line interval following the switch over moment.

Many modern television communications systems utilize techniques for maximizing the number of television signals passing through a signal channel. This is particularly true when the channel includes portions limited in bandwidth or in number. An example of a television signal channel limited in both bandwidth and in number is a television tape recorder intended for electronic newsgathering (ENG) or electronic journalism (EJ). Another example is earth-satellite transponder communications systems. In such systems, it is known to time-division multiplex by time-interleaving television signals on a line-to-line basis. For example, in the case of a tape recorder, two tracks may be used, one for the luminance channel and the other for the chrominance information. The chrominance information may be represented by two simultaneously occurring color-difference signals which for the purpose of being impressed upon the remaining track of the tape are time-compressed and sequentially applied to the tape as described in U.S. Patent application Ser. No. 124,107 filed Feb. 25, 1980 in the names of Dischert and Flory. In this manner, two substantially unrelated color-difference signals are alternately applied to the tape recorder for recording on a single track. In the case of a satellite transponder, a similar scheme may be used to maximize the utilization of the transponder. At the output of such systems, DC restoration may be required. Prior-art clamps requiring even one horizontal line to stabilize are clearly useless for the restoration of television signals in which alternate horizontal line intervals are derived from different sources.

SUMMARY OF THE INVENTION

A clamp for television signals derived from a number of sources includes a like number of coupling capacitors having one terminal in common, and each coupling capacitor also including a second terminal. The common terminal of the coupling capacitors is coupled to the source of television signals. A first controllable switch has a controlled current path between first and second terminals and also includes a control electrode by which the conduction of the current path can be controlled. A first terminal of the controlled current path is coupled to a source of reference voltage to which recurrent identifiable portions of the television signals are to be clamped. A second controllable switch is coupled to the second terminals of the coupling capacitors and to the second terminal of the controlled current path of the first controllable switch. A first control circuit is coupled to the second controllable switch for coupling the source of television signals to the second terminal of the first switch by sequential coupling of the second terminals of the coupling capacitors with the second terminal of the first switch in a timed relationship with the line-sequence of the source of signals. A second control circuit is coupled to the control terminal of the first controllable switch for rendering the controlled current path conductive during the recurrent identifiable portions of each horizontal line of television signal.

DESCRIPTION OF THE INVENTION

Figure 1:
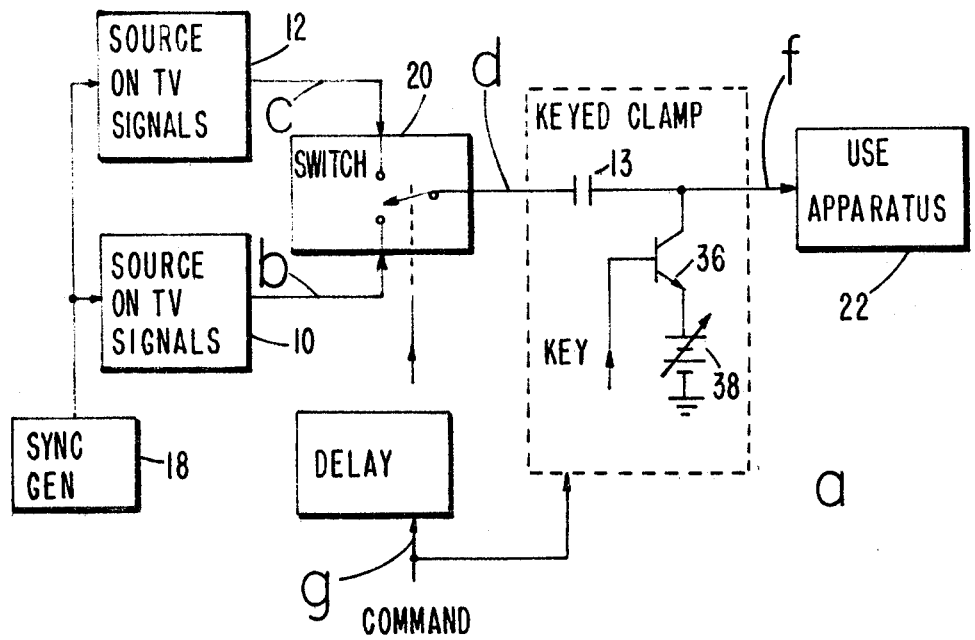
FIG. 1 illustrates a prior-art clamp arrangement adapted for operation from a plurality of signal sources, together with voltage-time plots illustrating its operation.
Figure 1:
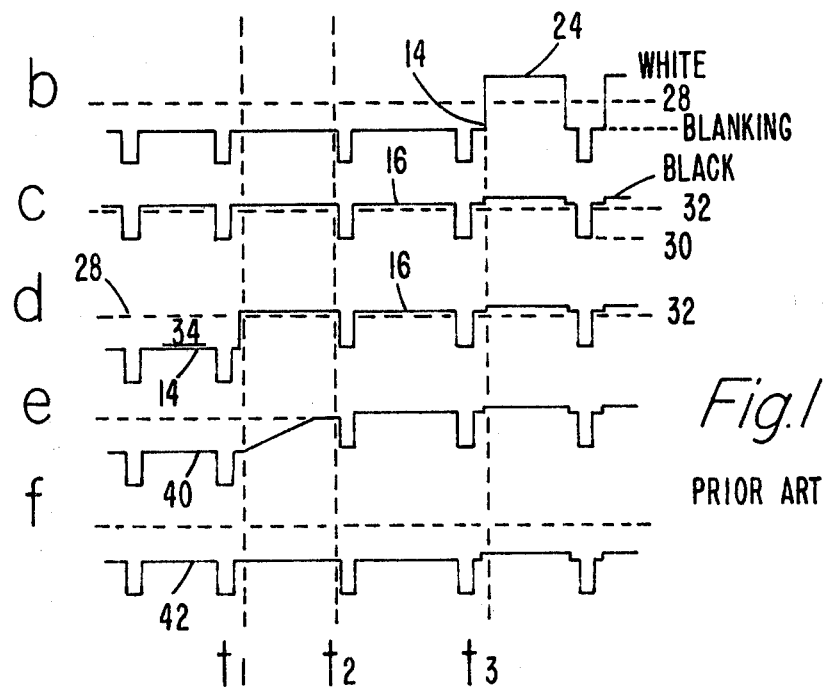

The arrangement of FIG. 1 is generally similar to that of the aforementioned Banks clamp. In FIG. 1, a first source 10 of television signals having a finite internal impedance produces on a conductor B a white raster including vertical and horizontal synchronizing signals, as illustrated by voltage waveform 14 of FIG. 1b. Waveform 14 as illustrated includes the last three horizontal line portions of the vertical blanking interval and, to the right of time T3, the first active line of the white raster. Another source 12 of television signals also having a finite internal impedance produces on conductor C a signal representative of a black raster, as illustrated by 16 of FIG. 1c. A synchronizing signal generator 18 is coupled to signal sources 10 and 12 to cause their vertical and horizontal sync intervals to coincide, as illustrated in the FIGURE. A controllable switch 20 is coupled to sources 10 and 12. Switch 20 as illustrated is a mechanical single-pole double-throw switch capable of coupling either conductor B or C to an output conductor D. In actual practice, switch 20 would be a solid-state switch. Either signal 14 or signal 16 as selected by switch 20 will be coupled to a using apparatus or load device 22 by way of a coupling or dc-blocking capacitor 13. As mentioned, such a coupling capacitor may result in a change in the reference level on conductor f at the load or output side of capacitor 13. For example, the average level of white-representative signal 14 may occur between white-representative portion 24 and blanking-level portion 26 of signal 14, as illustrated by dashed line 28. On the other hand, the average level of black-representative signal 16 may lie between sync-tip level 30 and blanking level, as illustrated by dashed line 32 in FIG. 1c. Thus, even though a particular identifiable portion such as the sync tips of voltage waveforms 14 and 16 may be at a reference level such as ground on conductors b and c, respectively, the average values 28 and 32 of signals 14 and 16, respectively, will fall on the reference level on conductor f when the signals 14 and 16 are AC-coupled to conductor f, unless a clamp is used. If the reference level on conductor f is ground, and no clamp is used, then for AC-coupled white-representative signal 24, the sync tips will take on a relatively large negative value and the white-representative signal a smaller positive value relative to ground, while black-representative signal 16 will have less negative sync tips, but the blanking level will be near ground. As also mentioned, such changes in the absolute value of the sync level may take place when the APL of the signal changes due to a change of scene rather than due to a change in the source of signals as described in conjunction with FIG. 1. If the use apparatus is a sync stripper, such changes may result in false triggering or failure to trigger.

The signal designated generally as 34 of FIG. 1b represents the ideal signal on conductor d when the average values of signals 14 and 16 are at the same reference level, such as ground and no clamp is used. In FIG. 1b, waveform 34 includes a portion of waveform 14 displaced negative from ground. At the time T1 at which switch 20 is thrown from contact with conductor B to contact with conductor C, there is a positive-going transition of the signal, but the ground reference remains the same. However, a transition occurs between the substantially negative blanking-level signal 14 and the slightly positive-going corresponding blanking level of signal 16. The step also changes the sync pulses of the all-black signal 16 relative to the ground potential axis 28, 32. Such a condition might cause a malfunctioning of sync separators previously set to operate in response to the blanking potential of signal 14.

In the arrangement of the Banks clamp, the waveform illustrated in FIG. 1b does not occur. Instead, just prior to the throwing of switch 20 at time T1, a command pulse keys a switch illustrated as a transistor 36 to hold the output level of capacitor 13 at a reference voltage generated by a circuit illustrated as a battery 38, which reference voltage is controlled to equal the blanking level previously established on conductor f by signal 14. Switch 36 is held in a conductive condition for the period of one horizontal line, between times T1 and T2. Consequently, the voltage transition occurring at time T1 and illustrated in FIG. 1b causes a difference in voltage across capacitor 13, which causes conventional current to flow from source 12 through capacitor 13, switch 36 and into reference source 38. Because of the internal impedance of source 12, a finite time is required for discharging, and the actual voltage waveform on conductor c is illustrated by waveform 40 of FIG. 1e. The total impedance in the charging path of conductor 13 is selected so that transient conditions die down over the interval of one horizontal line. The charging causes the right terminal or plate of capacitor 13 to become more negative than it had been at times prior to time T1. Consequently, the AC-coupled signals appearing on conductor f make their excursions about a more negative value after time T2, as illustrated by waveform 42 of FIG. 1f. As illustrated, the transition during the vertical blanking interval between an all-white raster and an all-black raster having different average values results in maintaining the sync pulses applied to the use apparatus at substantially the same level, notwithstanding the switchover.

Figure 2:
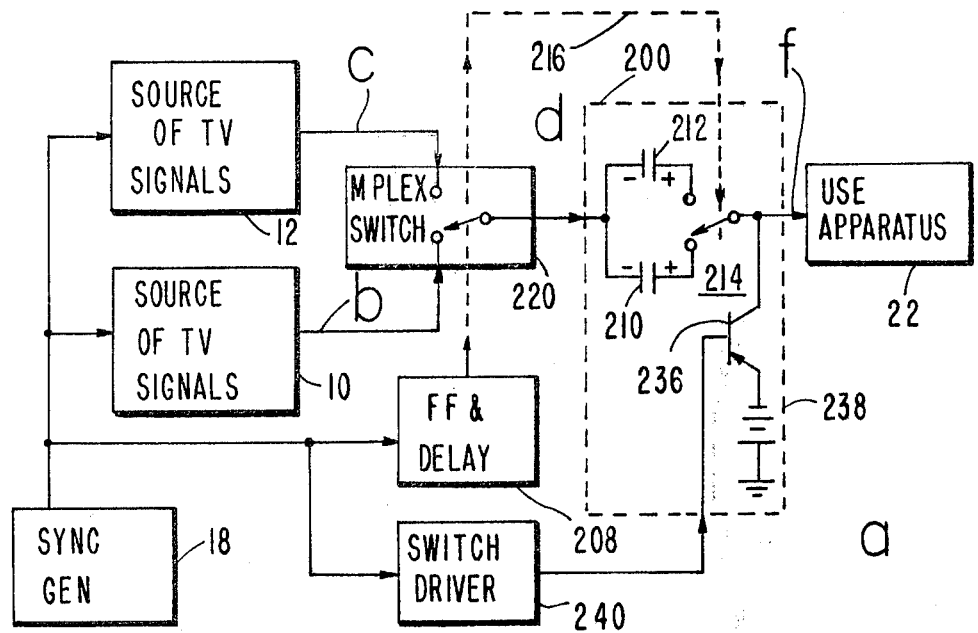
FIG. 2 illustrates a clamp arrangement according to the invention, including waveforms aiding in understanding the operation.
Figure 2:
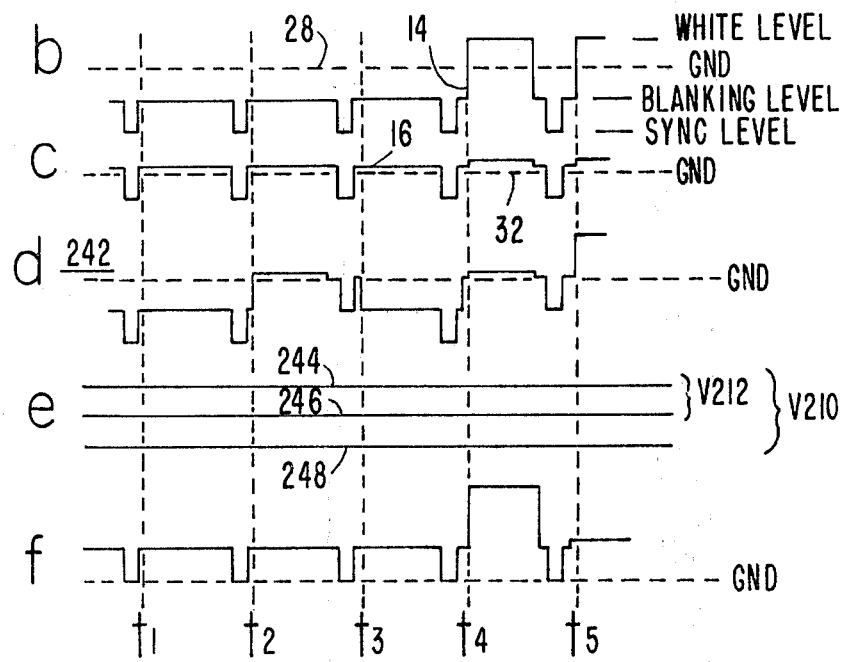

FIG. 2 indicates a source 10 and source 12 of television signals and a sync generator 18 for producing horizontal sync signals for maintaining the television sources in time coincidence. The horizontal sync signals generated by generator 18 are also applied to a flip-flop (ff) or divide-by-two circuit 208 which drives a multiplex switch 220. FF 208 may include a short delay element. As known, this results in selection of alternate lines for presentation to conductor d. It will be recognized that a clamp arrangement such as that described in conjunction with FIG. 1 may not provide useful information to use apparatus 22, since it requires clamping of output conductor f to a reference voltage for an entire horizontal line. Thus, operation of switch 220 with the clamp arrangement of FIG. 1 would result in application to use apparatus 22 of clamp voltages rather than signal voltages. In accordance with the invention, keyed clamp 200 of FIG. 2 includes a plurality of coupling capacitors 210, 212 equal in number to the number of source signals being multiplexed. In the embodiment shown, two sources are being multiplexed, and therefore two coupling capacitors are used. A second switch designated generally as 214 is driven synchronously with multiplex switch 220, as suggested by dotted line connection 216. Thus, when signal source 10 is coupled to conductor d, coupling capacitor 210 is coupled by switch 214 to conductor f, and when multiplex switch 220 connects conductor c to conductor d, switch 214 completes the connection to conductor f by way of capacitor 212. A controllable switch illustrated as a bipolar transistor 236 is driven by a switch driver 240 which renders switch 236 conductive during each horizontal sync interval to connect conductor f to a reference voltage source illustrated as a battery 238 during the sync intervals.

Voltage waveform 242 of FIG. 2d illustrates the voltage appearing on conductor d as a result of the switching of multiplex switch 220 at times T1–T5 corresponding to the end of the blanking interval associated with each horizontal sync pulse. As illustrated in FIG. 2d, portions of voltage waveform 14 appear in the intervals T1–T2, T3–T4 and following time T5. Those portions of waveform 242 in the intervals T2–T3, T4–T5 etc. are composed of corresponding portions of waveform 16 of FIG. 2c. It is apparent that the sync portions in the intervals T2–T3, T4–T5 do not represent the extreme excursion of the composite signal 242, and therefore the use apparatus may have trouble in distinguishing the sync portions from the active video portions. In accordance with the invention, the operation of clamp 236 in conjunction with the operation of multiplexing switch 214 corrects for the distortion introduced. In order to simplify the explanation, assume that the reference voltage is zero, and therefore the emitter of switch transistor 236 is coupled directly to ground rather than to a voltage source. Since switch 236 is rendered conductive during each horizontal sync interval, each sync pulse appearing on conductor f will be forced to assume ground potential, (neglecting switch offset voltages) as illustrated in FIG. 2f. As a result, each of the coupling capacitors 210, 212 will charge during the sync intervals during which they are coupled in-circuit. The voltage assumed by the coupling capacitors will represent the difference between ground potential on conductor f and the difference in voltage between the average value and the sync-tip value during those times when the coupling capacitor is connected in-circuit with switch 236. Thus, for the described situation in which the sync tips are at ground level, the difference in voltage V210 across capacitor 210 is represented by the distance between lines 244 and 248 of FIG. 2e, which is the distance between the sync level and average level 28 of FIG. 2b. The polarity of the voltage is illustrated by the symbols adjacent capacitor 210 in FIG. 2a. Similarly, the voltage V212 across capacitor 212 is represented in FIG. 2e by the difference between lines 244 and 246, and the polarity is as shown in FIG. 2a.

Figure 3:
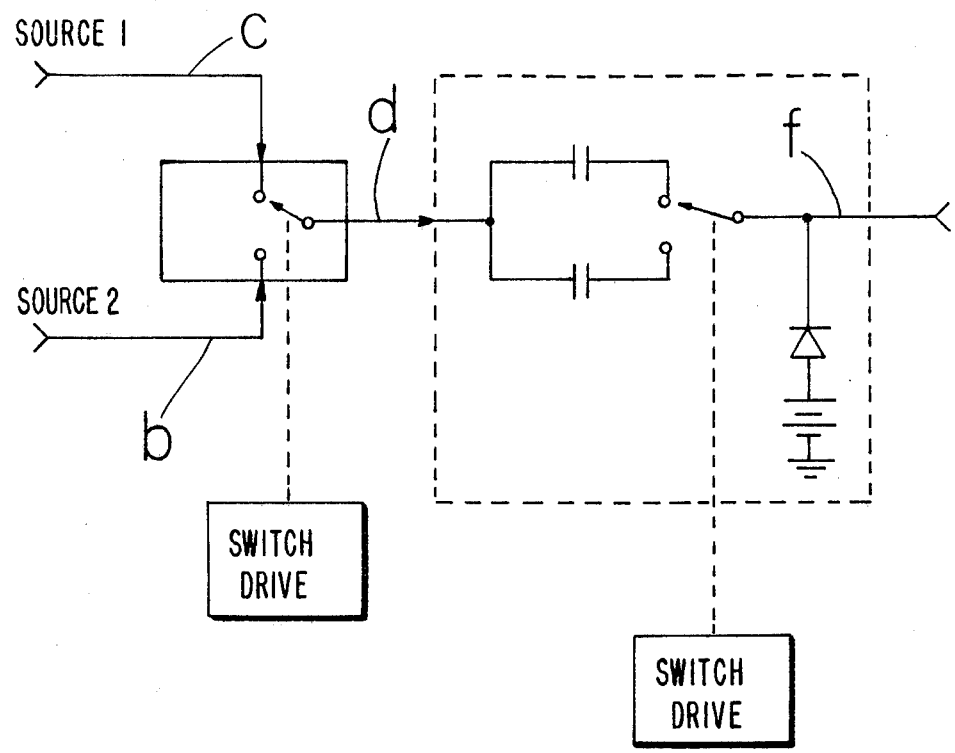
FIG. 3 illustrates another embodiment of the invention.

Other embodiments of the invention will be obvious to those skilled in the art. For example, three or more sources of television signal may be used, together with a corresponding number of coupling capacitors. Reference voltage generator 238 may produce either a positive or negative reference voltage, and the conduction characteristic of switch 236 may be adapted to suit. Relative delays may be introduced in switch driver 240 or in ff 208 to cause switching at any point on the signal which would cause any identifiable portion of the signal to be the clamped point. One or more synchronizers may be used to synchronize signals from asynchronous sources. Switch 236 for coupling the output conductor to a reference potential need not be clamped is at an amplitude extreme; a diode may be used instead as illustrated in FIG. 3.

What is claimed is:

1. A clamp for television signals from a plurality of sources, comprising:
   a source of a first plurality of line-sequential television signals, each line including a recurrent identifiable portion;
   a second plurality of coupling capacitors having a terminal in common, each coupling capacitor having a second terminal, said terminal in common being coupled to said source of television signals, said first and second pluralities being equal;
   a source of reference voltage to which said recurrent identifiable portions of said television signals are to be clamped;
   first controllable switch means including a controlled current path having first and second terminals and a control electrode, said first terminal of said controlled current path being coupled to said source of reference voltage;
   second controllable switch means coupled to said second terminals of said coupling capacitors and to said second terminal of said controlled current path of said first controllable switch means;
   first control means coupled to said second controllable switch means for coupling said source of television signals to said second terminal of said first switch means by sequential coupling of said second terminals of said coupling capacitors with said second terminal of said first switching means in timed relationship with the line-sequence of said source of television signals; and
   second control means coupled to said control terminal of said first controllable switch means for rendering said controlled current path conductive during said recurrent identifiable portions of each horizontal line.

2. A clamp according to claim 1 wherein said identifiable portions are sync portions.

3. A clamp according to claim 1 wherein said identifiable portions are blanking levels.

4. A clamp for television signals having an identifiable portion at an extreme amplitude excursion of the signal, said signals being derived in regular recurrence from different sources, the clamp comprising:

a plurality of coupling capacitors having a terminal in common, said common terminal being coupled to the source of television signals, said plurality being equal in number to the number of different sources from which said television signals are derived, each of said coupling capacitors also including a second terminal;

multiplex switch means coupled to said second terminals of said coupling capacitors and to an output terminal of said clamp for recurrently coupling each of said sources to said output terminal by way of one of said plurality of coupling capacitors;

a source of reference voltage; and controllable switch means coupled to said source of reference voltage and to said output terminal for coupling said reference voltage source to said output terminal during the extreme amplitude excursion of each of said signals.

5. A clamp pursuant to claim 4 wherein said controllable switch means comprises a diode.

6. A clamp pursuant to claim 4 wherein said controllable switch means is keyed.

* * * * *